United States Patent
Ruona et al.

(10) Patent No.: US 9,174,612 B2
(45) Date of Patent: Nov. 3, 2015

(54) VISCOUS BRAKE FOR DRIVELINE HEATING

(71) Applicant: Ford Global Technologies, LLC, Dearborn, MI (US)

(72) Inventors: William Charles Ruona, Farmington Hills, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 509 days.

(21) Appl. No.: 13/647,929

(22) Filed: Oct. 9, 2012

(65) Prior Publication Data

US 2014/0100080 A1   Apr. 10, 2014

(51) Int. Cl.
| | |
|---|---|
| *B60W 10/02* | (2006.01) |
| *B60T 1/10* | (2006.01) |
| *B60W 10/184* | (2012.01) |
| *B60W 30/194* | (2012.01) |
| *B60T 10/02* | (2006.01) |
| *B60W 10/16* | (2012.01) |
| *F16D 65/78* | (2006.01) |

(52) U.S. Cl.
CPC . *B60T 1/10* (2013.01); *B60T 10/02* (2013.01); *B60W 10/16* (2013.01); *B60W 10/184* (2013.01); *B60W 30/194* (2013.01); *B60W 2710/0688* (2013.01); *B60Y 2400/425* (2013.01); *F16D 2065/783* (2013.01); *Y10T 477/6389* (2015.01); *Y10T 477/6395* (2015.01); *Y10T 477/644* (2015.01)

(58) Field of Classification Search
CPC .......................... B60W 10/184; B60W 30/194
See application file for complete search history.

(56) References Cited

U.S. PATENT DOCUMENTS

| | | | |
|---|---|---|---|
| 4,736,821 A * | 4/1988 | Ries | 74/467 |
| 6,558,112 B2 | 5/2003 | Moroi et al. | |
| 6,729,992 B2 * | 5/2004 | Ima | 475/222 |
| 6,997,284 B1 * | 2/2006 | Nahrwold | 184/6.12 |
| 7,077,776 B2 | 7/2006 | Sorab et al. | |
| 7,614,367 B1 | 11/2009 | Frick | |
| 2012/0101699 A1 | 4/2012 | Boissinot et al. | |

FOREIGN PATENT DOCUMENTS

EP   0842800 B1   6/1997

* cited by examiner

*Primary Examiner* — Derek D Knight
(74) *Attorney, Agent, or Firm* — Julia Voutyras; Alleman Hall McCoy Russell & Tuttle LLP

(57) ABSTRACT

Embodiments for heating a vehicle driveline are provided. One example method for a vehicle comprises heating a fluid with kinetic vehicle energy in response to a vehicle braking request, and directing the fluid to a driveline component. In this way, kinetic vehicle energy during a vehicle braking event may be used to heat a driveline component.

16 Claims, 4 Drawing Sheets

VISCOUS BRAKE FOR DRIVELINE HEATING

FIELD

The present disclosure relates to a vehicle powertrain.

BACKGROUND AND SUMMARY

Heating of engine and vehicle components increases engine efficiency by reducing the viscosity of various lubricating fluids, thus reducing the energy needed to pump the fluids among the vehicle components. Further, a heated engine converts fuel to shaft work more efficiently than does a cold engine because of lowered heat losses to the combustion chamber. While the engine may be heated relatively rapidly via the heat produced during combustion, transferring the heat to downstream driveline components may take a longer duration, thus delaying when the driveline components reach operating temperature and extending the period that the vehicle operates with reduced efficiency. Further, heating the driveline components via energy sourced from fuel or other stored potential energy reduces fuel economy.

The inventors have recognized the above issues and provide a method to at least partly address them. In one embodiment, a method for a vehicle comprises heating a fluid with kinetic vehicle energy in response to a vehicle braking request, and directing the fluid to a driveline component.

The kinetic vehicle energy produced in response to a vehicle braking request may be used to heat a fluid, and this heated fluid may in turn heat a driveline component. To heat a fluid via kinetic vehicle energy, a viscous brake may be engaged responsive to the vehicle braking request. The viscous brake may decelerate the vehicle as requested by the vehicle braking request, while simultaneously heating the fluid used to lubricate the viscous brake. The heated fluid is then used to heat the driveline components, via a heat exchanger for example. In this way, the driveline components may be heated without relying solely on combustion heat, improving engine efficiency and fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
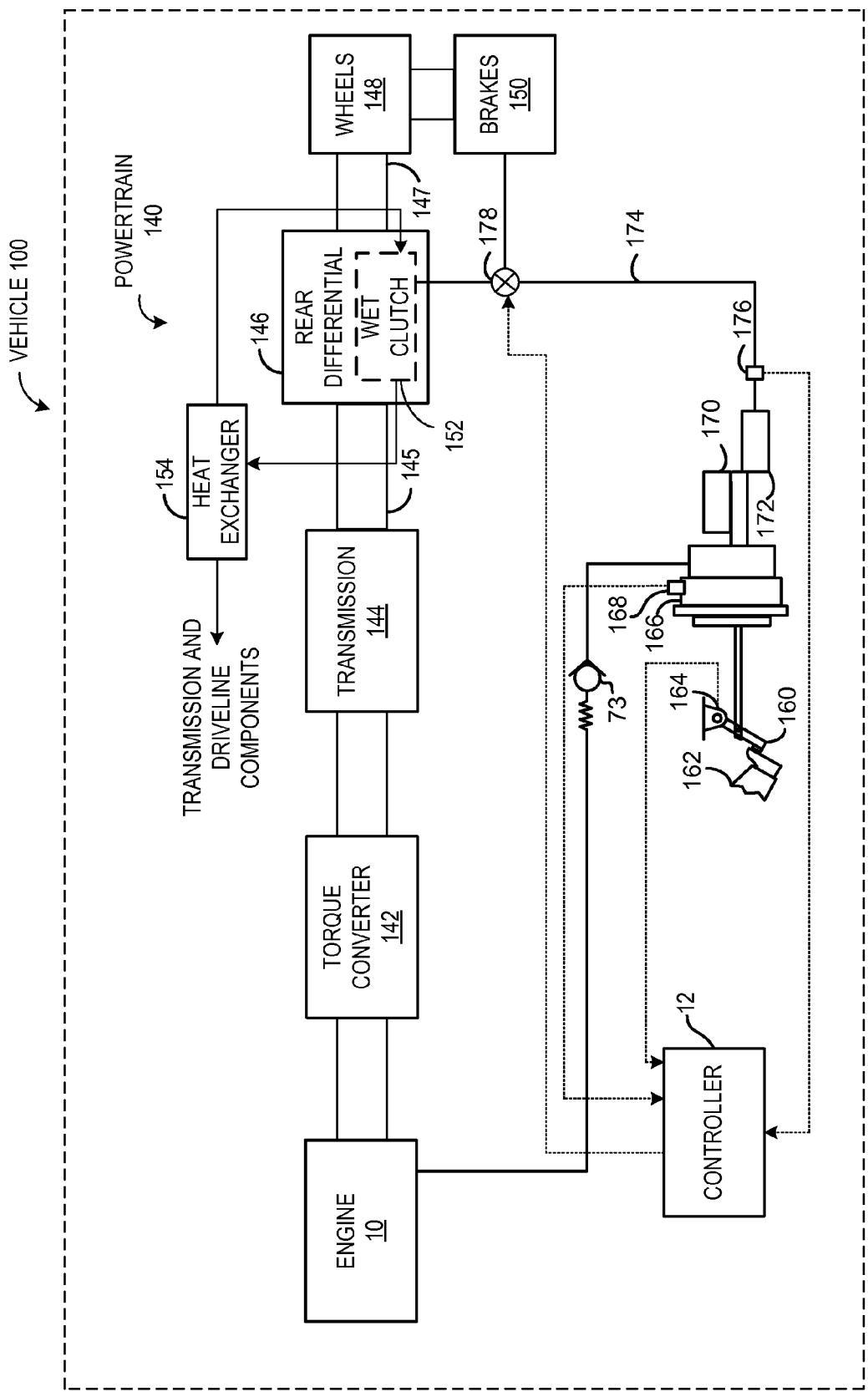
FIG. 1 shows a schematic diagram of a vehicle powertrain including an engine.
Figure 2:
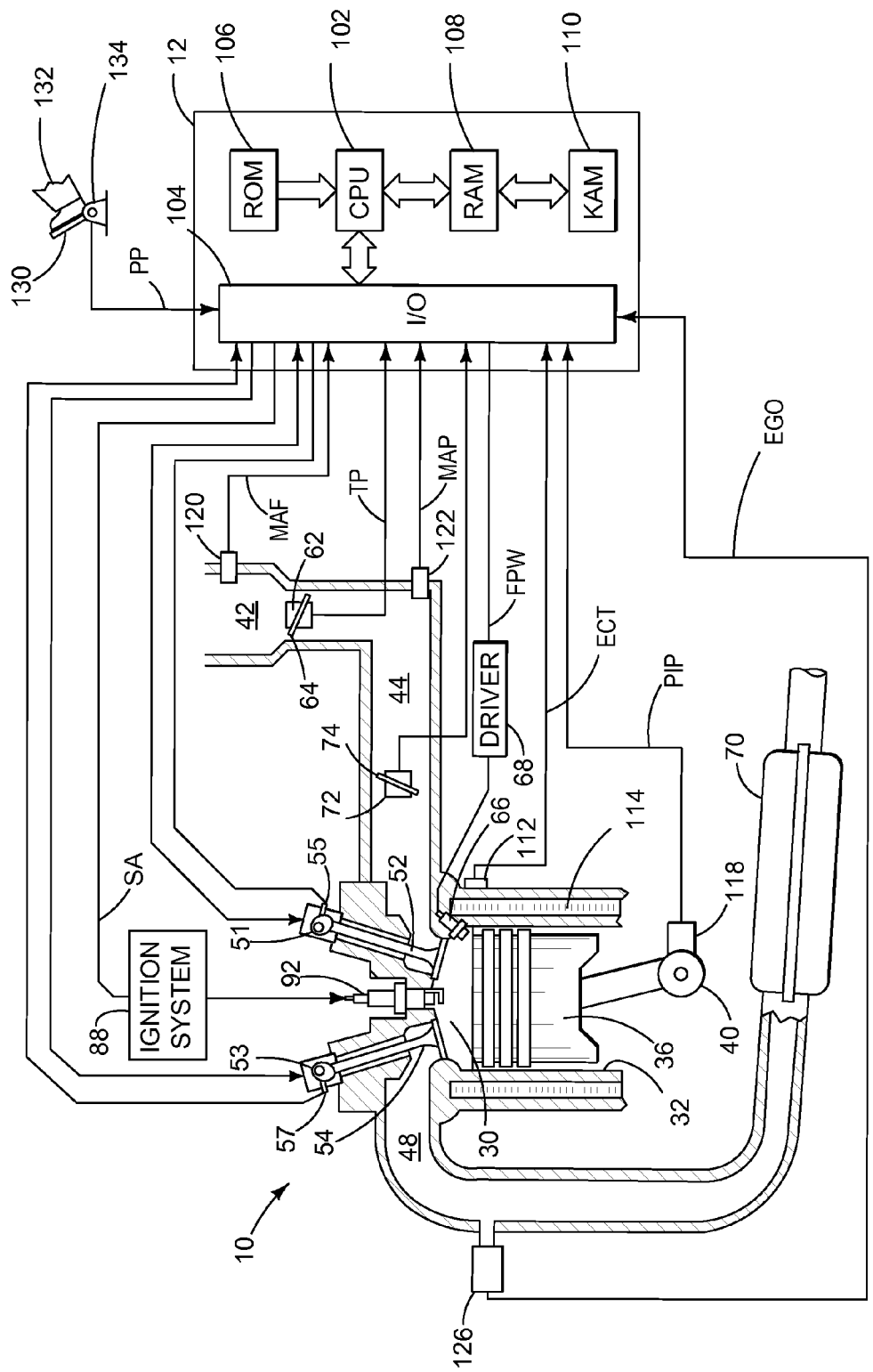
FIG. 2 shows a schematic diagram of a single cylinder of the engine of FIG. 1.

A viscous brake may be actuated to decelerate a vehicle in response to a vehicle braking request. The viscous brake may be bathed in lubricating fluid, and engagement of the viscous brake may shear and thus heat the lubricating fluid. The heated fluid may be used to heat various driveline components when the components are below operating temperature. FIG. 1 shows an example vehicle powertrain including a viscous brake and an engine. FIG. 2 shows a single cylinder of the engine depicted in FIG. 1. FIGS. 1 and 2 both depict a controller which may carry out the method illustrated in FIG. 3, which may result in the example vehicle operating parameters illustrated in FIG. 4.

Referring now specifically to FIG. 1, it illustrates vehicle powertrain 140 of a vehicle 100. The powertrain 140 includes an engine 10, torque converter 142, transmission 144, rear differential 146, and wheels 148. While not shown, the torque converter may include a controllable lock-up clutch. In this embodiment, the powertrain is outfitted with a rear differential 146 thus illustrating a rear-wheel drive configuration; however, a front-wheel drive configuration may also be used. The transmission is configured to drive wheels 148 through the rear differential 146 via driveshaft 145 and axle 147. The wheels 148 are also shown coupled to wheel brakes 150.

A lubricant heating system may also be included comprising a viscous brake that may provide both vehicle deceleration and lubricant heating. The viscous brake may create a drag torque on the driveshaft of the powertrain that opposes vehicle motion, and the drag torque is dissipated to heat a fluid lubricating the viscous brake. As shown in FIG. 1, a wet clutch 152 is used as the viscous brake. The wet clutch 152 is configured to heat driveline, engine, and/or transmission lubricating oil, thereby reducing friction and improving vehicle efficiency. In the example depicted in FIG. 1, the wet clutch 152 may be located within the housing of rear differential 146 downstream of transmission 144, and may act directly on the rear axle of the driveline. Heating of rear differential lubricant may be beneficial due to the positioning of the rear differential away from the engine and/or transmission. Additionally, by positioning the wet clutch within the differential housing, powertrain lash may be reduced. However, an additional wet clutch may act on the front axle as well (not shown in FIG. 1), in order to provide even clutching/braking to all wheels. The front wet clutch may be located within the housing of a front differential (not shown). It is to be understood that the wet clutches may alternatively be located on one or both of the vehicle axles outside of the differential.

The wet clutch may act to decelerate vehicle 100 when engaged by slowing or stopping rotation of the axle to which the wet clutch is coupled. The wet clutch may be lubricated by a fluid, and when the wet clutch is applied to reduce the rotation of the axle, the wet clutch may shear the lubrication fluid, thus heating the fluid. Thus, the wet clutch may act as a viscous brake and fluid heating mechanism. The lubrication fluid heated by wet clutch 152 may be directed to heat exchanger 154. Heat exchanger 154 may transfer heat from the heated fluid to other driveline or powertrain components. For example, heat exchanger 154 may heat transmission fluid used to lubricate transmission 144, differential fluid of differential 146, and/or lubricating oil directed to other driveline components. While not shown in FIG. 1, the heat exchanger may include a bypass to allow the fluid heated by heat exchanger 154 to bypass the heat exchanger. For example, when the driveline fluids and components are at operating temperature, the heat exchanger may be bypassed. Additionally, in some embodiments, the fluid from the wet clutch may directly heat downstream driveline components without an intervening heat exchanger.

The wet clutch may be actuated via a vehicle brake system. The vehicle brake system may include a brake booster 166, including a brake booster reservoir, which may be coupled to the intake manifold of engine 10 via check valve 73. In this way, brake booster 166 is in pneumatic communication with the intake manifold solely via a single check valve. Check valve 73 allows air to flow to the intake manifold from brake booster 166 and limits air flow to brake booster 166 from the intake manifold. Check valve 73 accommodates fast pull down of the reservoir pressure when reservoir pressure (e.g., of brake booster 166) is relatively high and intake manifold pressure is low. Additionally, or alternatively, a vacuum pump (not shown) may be selectively operated via a control signal from controller 12 to supply vacuum to brake booster 166.

Brake booster 166 may include an internal vacuum reservoir, and it may amplify force provided by foot 162 via brake pedal 160 to master cylinder 170 for applying vehicle brakes. Specifically, master cylinder 170 is coupled to a hydraulic brake system 172 including hydraulic brake line sensor 176, which may alternatively be positioned in the master cylinder to indicate master cylinder pressure. A hydraulic brake line 174 may transmit force to actuate brakes 150 in response to an operator pressing brake pedal 160, thus braking the vehicle. Brakes 150 may be standard friction brakes that slow or stop rotation of wheels 148.

Hydraulic brake line 174 may also be coupled to wet clutch 152. In this way, wet clutch 152 may be engaged via depression of brake pedal 160. A valve 178 may be controlled to direct brake fluid in hydraulic brake line 174 to one or both of wet clutch 152 and vehicle brakes 150. For example, the position of valve 178 may be controlled by controller 12 in response to driveline temperature and/or vehicle braking request. As will be explained in greater detail below, valve 178 may be adjusted to direct hydraulic brake fluid to wet clutch 152 in order to engage wet clutch 152 when the driveline temperature is below a threshold. Furthermore, when the driveline temperature is above the threshold temperature and/or when a vehicle brake request is above a threshold (e.g., hydraulic brake fluid pressure is above a threshold pressure), valve 178 may be adjusted to direct brake fluid to the friction brakes. Thus, the wet clutch may be engaged to brake the vehicle and transfer the heat produced during braking to powertrain components or fluids (e.g., engine and transmission lubricating oil).

The wet clutch and hydraulic brake system configuration described above is non-limiting, and other configurations are possible. For example, transmission 144, differential 146, and axle 147 may be combined into a transaxle configuration. In such a configuration, wet clutch 152 may be located within the transaxle. In another example, valve 178 may be a pressure-sensitive valve configured to direct brake fluid to wet clutch when brake fluid pressure is low and direct brake fluid to brakes 150 when brake fluid pressure is high. Further, a thermostat or other temperature-sensitive valve may also be present to selectively direct brake fluid to wet clutch 152 when driveline temperature is below a threshold. In yet another example, not shown, the wet clutch may be driven by electrical power from a battery or alternator. For example, the wet clutch may include an electric motor driven by power generated through the alternator via the engine, where the wet clutch mechanically heats the oil/lubricant through shearing, as noted above (as opposed to electrical heating).

In a further example, a fluid shear element may be coupled to a rotating member of the driveline (such as the wheels or the driveshaft). The fluid shear element may be controllably actuated to heat its fluid via shearing, and this fluid may be directed to heat the driveline components. The fluid shear element may further act as a pump to route the heated fluid to desired driveline components. Additionally, while the heat exchanger depicted in FIG. 1 is shown directing heated fluid to driveline components, in some embodiments, the heat from the wet clutch or the fluid shear element may be used to heat a cabin of the vehicle, or other suitable vehicle components.

A controller 12, further described in FIG. 2, receives varied information including lubricant temperatures, brake requests, engine speed, etc. For example, the controller may receive information from a position sensor 164 coupled to brake pedal 160 for sensing brake pedal position, a pressure sensor 125 for sensing brake booster vacuum, and a pressure sensor 176 for sensing master cylinder pressure (e.g., hydraulic brake pressure). The controller may be configured to actuate (e.g., enable, disable, etc.) the wet clutch, as well as other actuators, such as valve 178. Further, while in this example, a control system includes a single controller 12, it will be appreciated in view of this disclosure that multiple distributed control units and controllers may comprise the control system.

Referring now to FIG. 2, it includes a schematic diagram showing one cylinder of multi-cylinder internal combustion engine 10 of FIG. 1. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a charge motion control valve (CMCV) 74 and a CMCV plate 72 and may also include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of catalytic converter 70 (also referred to simply as catalyst 70). Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Exhaust gas sensor 126 may include a heater that is configured to be activated when exhaust gas temperature is low, in order to heat the exhaust gas sensor 126 to its operating temperature. The exhaust system may include light-off catalysts and underbody catalysts, as well as exhaust manifold, upstream and/or downstream air-fuel ratio sensors. Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof.

Storage medium read-only memory 106 can be programmed with computer readable data representing instructions executable by processor 102 for performing the methods described below as well as other variants that are anticipated but not specifically listed.

As described above, FIG. 2 shows only one cylinder of a multi-cylinder engine, and that each cylinder may similarly include its own set of intake/exhaust valves, fuel injector, spark plug, etc.

Thus, the systems described above provide for a system for a vehicle comprising a viscous brake located along a length of powertrain between an engine and a vehicle wheel, downstream of a transmission, and a heat exchanger in fluid communication with the viscous brake and a moving driveline component. The viscous brake may be located on an axle of the vehicle, and a duct may be located between the viscous brake and the heat exchanger.

The system may further comprise a controller including non-transitory executable instructions to selectively actuate the viscous brake in response to a vehicle braking request. The instructions may be further executable to actuate the viscous brake when the vehicle braking request is below a first threshold and when a driveline temperature is below a second threshold. The system may include vehicle friction brakes, and the instructions may be further executable to actuate the vehicle friction brakes in response to the vehicle braking request being above the first threshold. The instructions may be further executable to actuate the vehicle friction brakes in response to the vehicle braking request when the driveline temperature is above the second threshold.

Figure 3:
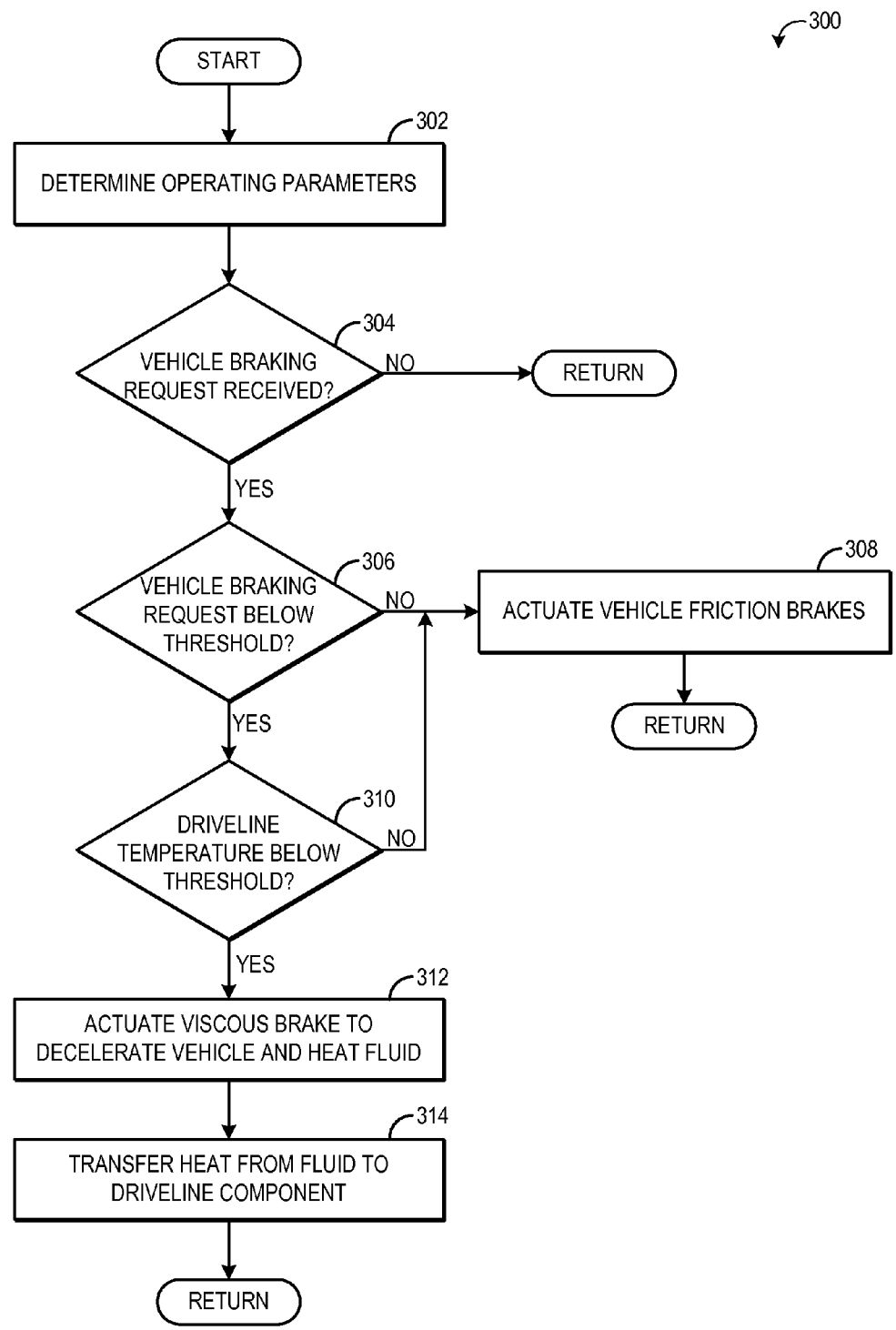
FIG. 3 is a flow chart illustrating an example method for actuating a viscous brake.

FIG. 3 is a flow chart illustrating a method 300 for heating a fluid via kinetic vehicle energy. Method 300 may be carried out by a controller, such as controller 12, according to instructions stored thereon. Method 300 may actuate a viscous brake, such as wet clutch 152 of FIG. 1, in response to a vehicle braking request when a driveline temperature is below a threshold. In doing so, heat from the viscous brake may be transferred to a driveline component.

At 302, method 300 includes determining engine operating parameters. The engine operating parameters may include engine temperature, transmission fluid temperature, driveline temperature (such as differential fluid temperature, brake fluid temperature, etc.), brake pedal position, hydraulic brake pressure, and other parameters. At 304, it is determined if a vehicle braking request is received. A vehicle brake request may be detected if the brake pedal is depressed past a threshold position and/or if hydraulic brake fluid pressure increases by a threshold amount. If a brake request is not received, method 300 returns.

If a vehicle braking request is received, method 300 proceeds to 306 to determine if the vehicle braking request is above a threshold. As explained previously, the vehicle brake request may be detected based on a change in brake pedal position or based on a change in hydraulic brake fluid pressure. If the brake pedal position changes (e.g., is depressed) by more than a threshold amount, or if the hydraulic brake pressure increases by more than a threshold amount, the vehicle brake request may be above the threshold. The threshold brake request may be a suitable threshold above which the viscous brake alone is not capable of providing. For example, the viscous brake may be able to stop a slow-moving vehicle or slow a faster-moving vehicle but may not be able to provide enough braking capacity to respond to a hard braking at a higher vehicle speed. In one example, the vehicle braking threshold may be a brake request of 50% of the vehicle braking capacity (e.g., the brake pedal depressed by 50%).

If the vehicle brake request is above the threshold, the viscous brake may not adequately be able to provide the brake request, and thus method 300 proceeds to 308 to actuate the vehicle friction brakes, and then method 300 returns. The vehicle frication brakes may be actuated in one example by adjusting a position of a valve located in the hydraulic brake line (such as valve 178), in order to direct some or all of the hydraulic brake fluid to the friction brakes. If the vehicle brake request is below the threshold, method 300 proceeds to 310 to determine if a driveline temperature is below a threshold. The driveline temperature may be a suitable temperature that is indicative of the temperature of one or more components of the driveline. For example, the driveline temperature may include a temperature of a moving driveline component, such as a differential, or may include a temperature of a fluid used to lubricate a moving driveline component. The driveline temperature may be measured directly with a temperature sensor, or it may be inferred based on engine temperature. The driveline components may include the vehicle transmission in some embodiments. The threshold temperature may be standard operating temperature for the driveline component measured, or it may be a temperature of the lubricating fluid at which the fluid viscosity is of a suitably low value.

If the driveline temperature is not below the threshold temperature, method 300 loops back to 308 to actuate the vehicle friction brakes. However, if the driveline temperature is below the threshold, method 300 proceeds to 312 to actuate the viscous brake. The viscous brake may be actuated by directing hydraulic brake fluid to the viscous brake, via adjustment of valve 178 for example. When the viscous brake is actuated, the temperature of the fluid of the viscous brake increases. The heat from this fluid is transferred to the driveline components at 314. In one example, the fluid from the viscous brake may be directed to a heat exchanger, where the heat from the fluid warms a driveline lubricating fluid, such as the transmission fluid, differential fluid, or other fluid. In another example, the viscous brake may be included in the same lubricating fluid circuit as one or more driveline components, and may directly heat the driveline lubricating fluid.

Thus, when the driveline temperature is below a threshold and a vehicle braking request has been received, the viscous brake may be actuated in order to generate heat and provide the braking request. This heat can then be transferred to other driveline components. As the braking capacity of the viscous brake may be limited, the regular vehicle friction brakes may be engaged in some conditions. For example, if the brake request is above a threshold, the friction brakes may be actuated to brake the vehicle. Further, if the driveline temperature is not below the threshold, the vehicle brake request may be provided by the friction brakes rather than the viscous brake to avoid unnecessary heat generation in the driveline.

In further examples, the viscous brake may be engaged during conditions other than engine cold start. For example, the viscous brake may be engaged during a long deceleration in order to prevent an over-temperature condition of the vehicle friction brakes. When traveling down a long decline, for example, the friction brakes may overheat, leading to loss of braking. To prevent this, the viscous brake may be engaged in response to an indication that the friction brakes have reached a threshold temperature. While method 300 of FIG. 3 illustrates the friction brakes and viscous brakes being actuated separately, in some embodiments, the friction brakes and viscous brake may be actuated simultaneously. In one example, when the driveline temperature is below the threshold, the friction brakes and viscous brake may be actuated in response to a vehicle braking request that is above the brake request threshold. In this way, the requested vehicle braking may be provided while still providing heat to the driveline components. Additionally, while method 300 illustrates heat being transferred from the viscous brake to the driveline components, in other embodiments it may be possible to transfer heat from the driveline components to the viscous brake.

Figure 4:
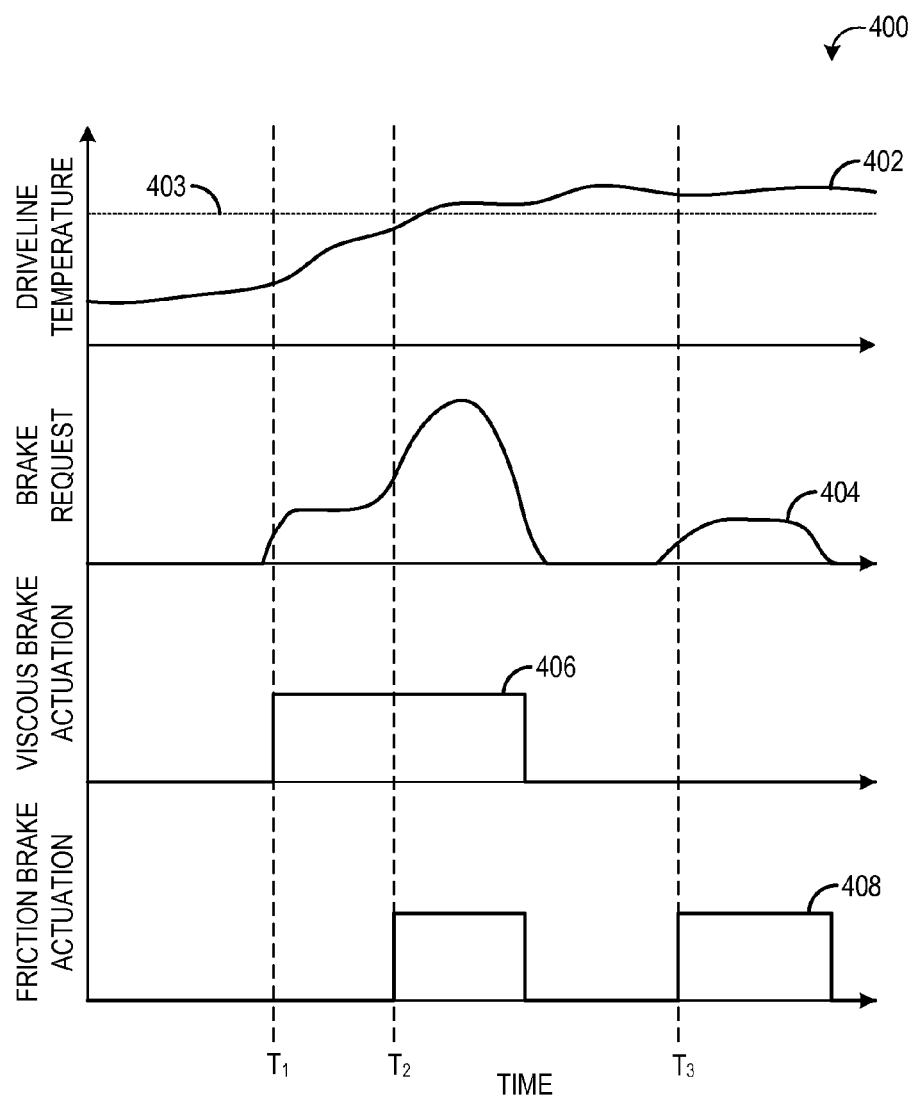
FIG. 4 is a diagram illustrating example vehicle operating parameters during actuation of a viscous brake.

FIG. 4 is a diagram 400 illustrating various vehicle operating parameters during a period of operation when driveline temperature is below a threshold temperature. Driveline temperature may be below the threshold temperature following an engine cold start (when the engine starts from ambient temperature), for example. While the engine may be brought to operating temperature rapidly during following a cold start, the driveline components may take a longer duration to reach operating temperature. Thus, the vehicle may be operated (e.g., driven) even with relatively cool driveline component temperatures. The increased viscosity of the driveline fluids may decrease engine efficiency, and thus the engine may execute method 300 in order to heat the driveline components. During the execution of method 300, a viscous brake is applied when a vehicle brake request is received and the driveline temperature is below a threshold. Diagram 400 illustrates example driveline temperature, vehicle brake request, viscous brake actuation, and vehicle brake actuation during a low driveline-temperature vehicle operation.

Curve 402 depicts driveline temperature. The driveline temperature may be a temperature of a lubricating fluid of the driveline, such as transmission fluid temperature or differential fluid temperature. The driveline temperature may have a threshold temperature above which the viscosity of the fluids in the driveline are of sufficiently low viscosity to prevent engine efficiency losses. Below the threshold temperature, illustrated by line 403, the viscous brake may be actuated to heat the driveline components when a vehicle brake request is received.

Curve 404 illustrates vehicle brake request input by an operator via a brake pedal. The brake request may be detected by a change in brake pedal position or a change in hydraulic brake pressure. At time $T_1$, a brake request is received. Because the driveline temperature is below the threshold, the viscous brake, illustrated by curve 406, is actuated. The initial brake request is relatively low, and thus only the viscous brake is actuated to provide the braking request. However, at time $T_2$, the brake request intensity is increased above a threshold, and the friction brakes are also actuated to provide the requested braking, illustrated by curve 408. During the brake request following time $T_2$, both the viscous brake and the friction brakes are actuated. However, in some embodiments, when the friction brakes are activated, the viscous brake may be deactivated.

Due to the actuation of the viscous brake, the driveline temperature increases. As explained previously, the actuation of the viscous brake may shear the fluid of the viscous brake, heating the fluid. This heat is then transferred to one or more driveline components to heat the driveline. After the end of the brake request, the friction brakes and viscous brake are deactivated. Further, the driveline temperature increases above the threshold temperature. As a result of the increased driveline temperature, when a second brake request is received at time $T_3$, only the friction brakes are actuated, and not the viscous brake.

Thus, in one example, a vehicle method comprises heating a fluid with kinetic vehicle energy in response to a vehicle braking request; and directing the fluid to a driveline component. Heating the fluid with kinetic vehicle energy may further comprise applying a viscous brake located along a length of powertrain between an engine and a vehicle wheel. The viscous brake may create a drag torque on a driveshaft of the powertrain that opposes vehicle motion, and the drag torque is dissipated to heat the fluid. The method may further comprise applying the viscous brake in response to a driveline temperature being less than a threshold temperature.

The method may also include if the vehicle braking request is lower than a threshold, applying the viscous brake without applying vehicle friction brakes, and if the vehicle braking request is greater than the threshold, applying the vehicle friction brakes. The method may include applying vehicle friction brakes in response to the vehicle braking request. The viscous brake may comprise a wet clutch, and the viscous brake may be located on a vehicle axle within a differential housing. The fluid may be directed to a driveline component that is less than a threshold temperature.

In another example, a vehicle method comprises during a first condition, decelerating the vehicle and heating a fluid by applying a wet clutch located on a vehicle axle in a differential housing, and directing the fluid to a driveline component; and, during a second condition, decelerating the vehicle by applying vehicle friction brakes. The first condition may comprise a vehicle brake request below a threshold, and the second condition may comprise a vehicle brake request above the threshold. The first condition may further comprise driveline temperature below a threshold temperature. The method may further comprise simultaneously decelerating the vehicle by applying the vehicle friction brakes during the first condition. The wet clutch may create a drag torque on a driveshaft of a powertrain that opposes vehicle motion, and the drag torque may be dissipated to heat the fluid.

While the examples described above utilize a wet clutch on each vehicle axle, to slow both wheels, a single wet clutch may be deployed that would slow both axles. For example, a wet clutch housed in inter-axle differential may be used. In other examples, dual wet clutches may each control one wheel (or each axle if the differential is an inter-axle differential).

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle method, comprising:
heating a fluid with kinetic vehicle energy by applying a viscous brake via a valve adjusted by a controller with non-transitory instructions stored in memory without applying friction brakes, in response to a vehicle braking request below a threshold and a driveline temperature below a threshold temperature;
applying the vehicle friction brakes if the vehicle braking request is greater than the threshold; and
directing the heated fluid to a driveline component.

2. The method of claim 1, wherein heating the fluid with kinetic vehicle energy further comprises applying the viscous brake located along a length of a powertrain between an engine and a vehicle wheel, where the viscous brake creates a drag torque on a driveshaft of the powertrain that opposes vehicle motion, and where the drag torque is dissipated to heat the fluid.

3. The method of claim 2, wherein the friction brake is downstream of a transmission.

4. The method of claim 2, further comprising applying the vehicle friction brakes in response to the vehicle braking request.

5. The method of claim 2, wherein the viscous brake comprises a wet clutch.

6. The method of claim 2, wherein the viscous brake is located on a vehicle axle within a differential housing.

7. The method of claim 1, wherein directing the heated fluid to the driveline component further comprises directing the heated fluid to a driveline component that is less than a threshold temperature.

8. A vehicle method, comprising:
during a first condition with driveline temperature less than a threshold, decelerating a vehicle and heating a fluid by applying a wet clutch located on a vehicle axle in a differential housing without applying friction wheel brakes;
directing the heated fluid to a driveline component; and
during a second condition with driveline temperature greater than the threshold, decelerating the vehicle by applying only vehicle friction wheel brakes.

9. The method of claim 8, wherein the first condition comprises a vehicle brake request below a threshold, and wherein the second condition comprises a vehicle brake request above the threshold.

10. The method of claim 8, further comprising simultaneously decelerating the vehicle by applying the vehicle friction wheel brakes during the first condition.

11. The method of claim 8, where the wet clutch creates a drag torque on a driveshaft of a powertrain that opposes vehicle motion, where the drag torque is dissipated to heat the fluid.

12. A system for a vehicle, comprising:
a viscous brake located along a length of a powertrain between an engine and a vehicle wheel, downstream of a transmission;
vehicle friction brakes;
a heat exchanger in fluid communication with the viscous brake and a moving driveline component; and
a controller including non-transitory executable instructions to selectively actuate the viscous brake in response to a vehicle braking request below a first threshold, and to actuate the vehicle friction brakes in response to the vehicle braking request being above the first threshold.

13. The system of claim 12, wherein the viscous brake is located on an axle of the vehicle.

14. The system of claim 12, further comprising a duct between the viscous brake and the heat exchanger.

15. The system of claim 12, wherein the instructions are further executable to actuate the viscous brake when a driveline temperature is below a second threshold.

16. The system of claim 15, wherein the instructions are further executable to actuate the vehicle friction brakes in response to the vehicle braking request when the driveline temperature is above the second threshold.

* * * * *